(12) United States Patent
Wang et al.

(10) Patent No.: US 11,426,951 B2
(45) Date of Patent: Aug. 30, 2022

(54) EXPANDABLE BLADDERS AS TOOLING FOR COMPOSITE PARTS

(71) Applicant: The Boeing Company, Chicago, IL (US)

(72) Inventors: Xiaoxi Wang, Mukilteo, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 250 days.

(21) Appl. No.: 16/237,912

(22) Filed: Jan. 2, 2019

(65) Prior Publication Data
US 2020/0207033 A1    Jul. 2, 2020

(51) Int. Cl.
*B29C 70/34* (2006.01)
*B29C 33/48* (2006.01)
*B29K 105/08* (2006.01)
*B29K 307/04* (2006.01)
*B29L 31/30* (2006.01)

(52) U.S. Cl.
CPC .......... *B29C 70/342* (2013.01); *B29C 33/485* (2013.01); *B29K 2105/0872* (2013.01); *B29K 2307/04* (2013.01); *B29L 2031/3076* (2013.01)

(58) Field of Classification Search
CPC .... B29C 2043/3205; B29C 2043/3261; B29C 2043/3652; B29C 2043/3657; B29C 33/3821; B29C 33/448; B29C 33/485; B29C 33/505; B29C 33/54; B29C 43/02; B29C 43/3642; B29C 70/342; B29C 70/446; B29C 70/54; B29C 44/0415; B29K 2105/048

USPC ........................................................ 264/313
See application file for complete search history.

(56) References Cited

U.S. PATENT DOCUMENTS

| 4,828,639 A * | 5/1989 | Aker ..................... B29C 43/32 156/245 |
| 9,138,919 B2 | 9/2015 | Morris et al. |
| 9,868,233 B2 | 1/2018 | Mishra et al. |
| 2006/0175730 A1 | 8/2006 | Merkel |
| 2007/0080481 A1 * | 4/2007 | Kismarton .......... B29C 43/3642 264/236 |

(Continued)

FOREIGN PATENT DOCUMENTS

| CN | 102806668 A | 12/2012 |
| EP | 3193164 A1 | 7/2017 |

(Continued)

OTHER PUBLICATIONS

Silicone rubber—Wikipedia, 2018 (Year: 2018).*

(Continued)

*Primary Examiner* — Yunjun Kim
(74) *Attorney, Agent, or Firm* — Duft & Bornsen, PC

(57) ABSTRACT

Systems and methods are provided for utilizing pellet-loaded bladders to consolidate and/or harden composite parts. One embodiment is a method for fabricating a composite part. The method includes laying up a preform that is made of fiber reinforced material and that includes a cavity, inserting one or more bladders that are loaded with expandable pellets into the cavity, inflating the bladders in response to a triggering condition, consolidating the preform while the bladders are inflated, deflating the bladders, and removing the bladders from the cavity.

22 Claims, 10 Drawing Sheets

(56) References Cited

U.S. PATENT DOCUMENTS

| | | | |
|---|---|---|---|
| 2009/0078826 A1 | 3/2009 | Haensch et al. | |
| 2010/0015265 A1* | 1/2010 | Vontell | B29C 33/50 |
| | | | 425/53 |
| 2013/0274037 A1 | 10/2013 | Sheng | |
| 2020/0148851 A1* | 5/2020 | Queiroz Da Fonseca | |
| | | | B29B 9/12 |
| 2020/0238638 A1* | 7/2020 | Toriyama | B29C 43/02 |

FOREIGN PATENT DOCUMENTS

| | | | | |
|---|---|---|---|---|
| GB | 2250466 A | * | 6/1992 | B29C 49/48 |
| JP | 6405433 B1 | | 10/2018 | |
| WO | WO-2014037361 A | * | 3/2014 | B29C 44/3461 |

OTHER PUBLICATIONS

European Search Report; Application EP19210412; dated May 20, 2020.
U.S. Appl. No. 16/053,733.
European Examination Report; Application 19210412.3; dated Sep. 15, 2021.

\* cited by examiner

EXPANDABLE BLADDERS AS TOOLING FOR COMPOSITE PARTS

FIELD

The disclosure relates to the field of fabrication, and in particular, to fabrication of composite parts.

BACKGROUND

Composite parts provide structural strength for vehicles as well as for structures. For example, a stringer or other structural support may be fabricated by laying up a preform that includes sheets of fiber reinforced material arranged in a desired shape (e.g., a "C" shaped cross-section, an "I" shaped cross-section, a "hat" cross-section, and others). The preform may then be hardened into a composite part.

Preforms lack structural strength before they are hardened (e.g., cured or solidified). Forming tools therefore press and hold the preform in a desired shape before the preform is hardened. However, pressing and holding a preform in a desired shape may be difficult if that shape includes a cavity. In these circumstances, sharp internal corners within the cavity may harden and bind to the forming tool, increasing the difficulty of removing the forming tool after the preform has been hardened into a composite part. Furthermore, it may be difficult to evenly apply forces across the entire cavity of the preform. This means that it may be difficult to fully consolidate a preform having an internal cavity.

Therefore, it would be desirable to have a method and apparatus that take into account at least some of the issues discussed above, as well as other possible issues.

SUMMARY

Embodiments described herein provide flexible bladders that are loaded with expandable pellets, and may be used as forming tools for a cavity of a preform. By adjusting the size, shape, and position of each bladder with respect to other bladders in the cavity, forces may be applied evenly across the cavity. Furthermore, the pellets may expand in response to heat applied during hardening of the preform. This causes the bladders to enforce a desired shape during hardening, and then shrink after hardening has completed (and the part has cooled). After the bladders have shrunk, they are easier to remove from the resulting composite part.

One embodiment is a method for fabricating a composite part. The method includes laying up a preform that is made of fiber reinforced material and that includes a cavity, inserting one or more bladders that are loaded with expandable pellets into the cavity, inflating the bladders in response to a triggering condition, consolidating the preform while the bladders are inflated, deflating the bladders, and removing the bladders from the cavity.

A further embodiment is a non-transitory computer readable medium. embodying programmed instructions which, when executed by a processor, are operable for performing a method for fabricating a composite part. The method includes laying up a preform that is made of fiber reinforced material and that includes a cavity, inserting one or more bladders that are loaded with expandable pellets into the cavity, inflating the bladders in response to a triggering condition, consolidating the preform while the bladders are inflated, deflating the bladders, and removing the bladders from the cavity.

Yet another embodiment is an apparatus for fabricating a composite part. The apparatus includes a bladder, and expandable pellets that are disposed within an internal space of the bladder and that include a foaming agent.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers may exhibit different fiber orientations in order to increase the strength of the resulting composite along different dimensions. The preform may include a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated. The following FIGS. and description describe bladders and other components that facilitate the shaping of composite parts.

Figure 1:
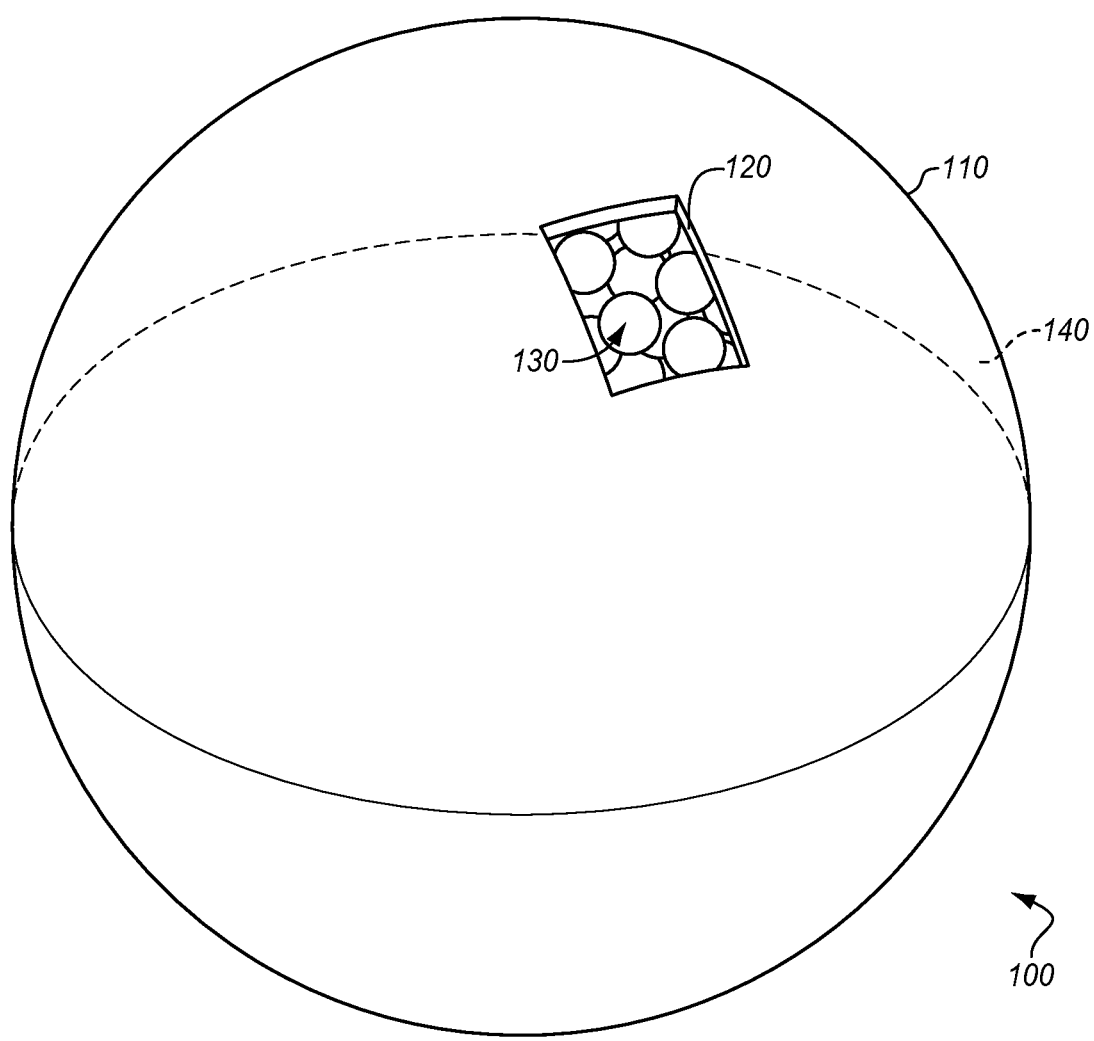
FIG. 1 is a perspective view of a bladder that includes a section cut and expandable pellets in an illustrative embodiment.

FIG. 1 is a perspective view of a bladder 100 that includes a section cut that reveals pellets 130 in an illustrative embodiment. Bladder 100 comprises any system, device, or component having a flexible, expandable space (such as internal space 140) that is loaded with pellets 130. Pellets 130 expand in response to a triggering condition, such as heat applied, during hardening of a preform into a composite part, that triggers a phase change for a component of pellets 130. This causes bladder 100 to expand. The expansion of bladder 100 applies pressure to consolidate and compact a preform into a desired shape. In this embodiment, bladder 100 includes a flexible casing 110 which is configured to deform in response to the expansion of pellets 130. For example, flexible casing 110 may comprise a plastically or elastically deformable material that does not melt at hardening temperatures of three hundred and fifty degrees Fahrenheit. Flexible casing 110 therefore allows pellets 130 to increase the volume of bladder 100, yet also prevents pellets 130 from expanding unrestricted in all directions. This provides a technical benefit by constraining the manner in which pellets 130 expand, and facilitating removal of pellets 130 after hardening of a preform into a composite part. While bladder 100 is illustrated as spherical in this embodiment, bladder 100 may assume tubular shapes, or other shapes as desired.

Pellets 130 are visible via cut-out 120 in bladder 100. Cut-out 120 is provided purely for facilitating illustration of pellets 130. However, in further embodiments, a cut-out 120 or port (not shown) may be included at bladder 100 in order to facilitate the loading of pellets 130 into, or unloading of pellets 130 out of, bladder 100. Pellets 130 are small, granular components that are made of a deformable material, such as a thermoplastic. Pellets 130 include an internal foaming agent (described below at FIGS. 7-8). When a pellet 130 is triggered (e.g., heated), the foaming agent increases in volume, which increases the volume of the pellet 130. Upon cooling, the foaming agent decreases in volume, which may cause the pellet 130 to collapse. After use, pellets 130 may be recycled and made into additional pellets.

Illustrative details of the operation of bladder 100 will be discussed with regard to FIG. 2. Assume, for this embodiment, that one or more bladders 100 (e.g., a bladder and an additional bladder) have been loaded with pellets 130, and await use in fabricating a composite part.

Figure 2:
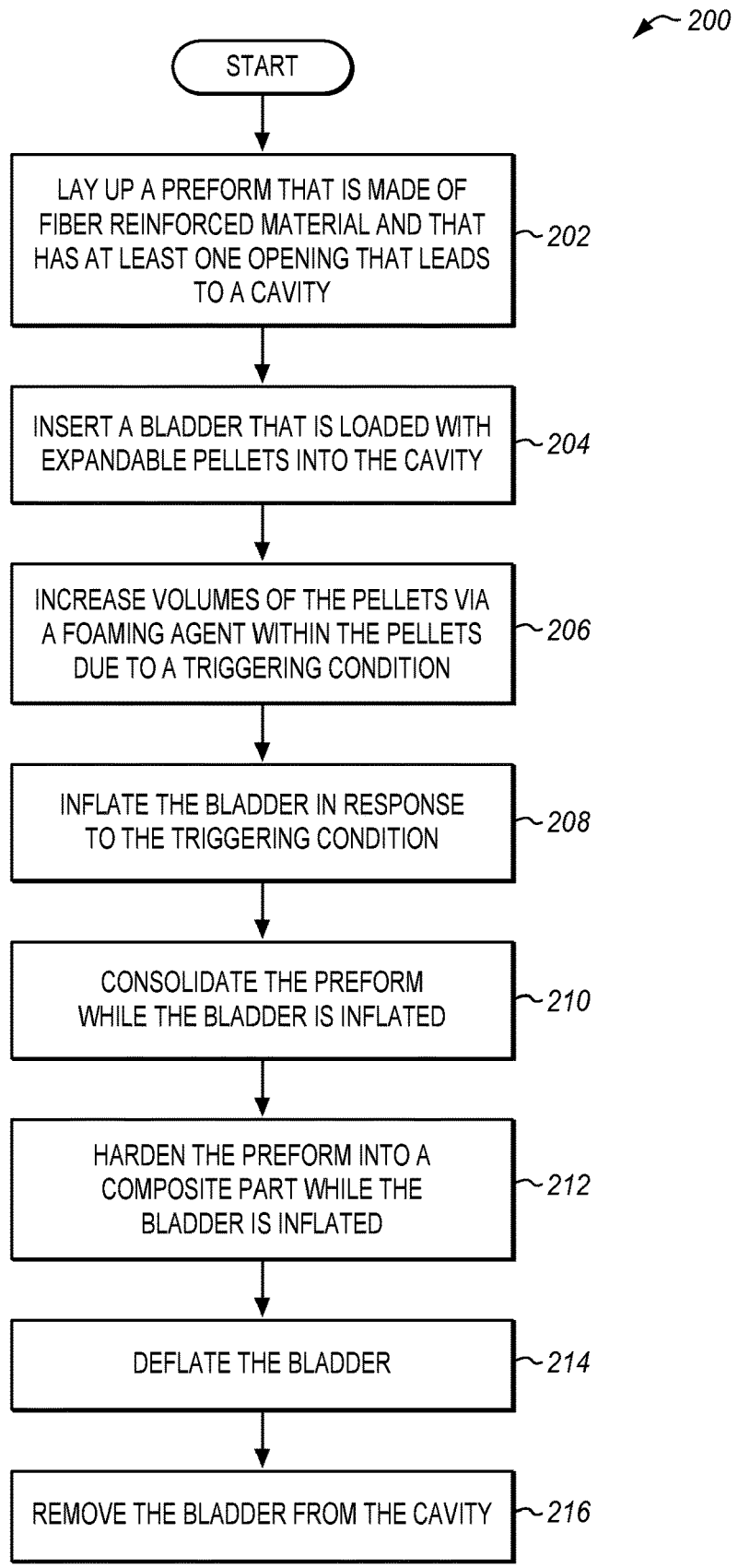
FIG. 2 is a flowchart illustrating a method for fabricating a composite part in an illustrative embodiment.

FIG. 2 is a flowchart illustrating a method 200 for fabricating a composite part in an illustrative embodiment. The steps of method 200 are described with reference to bladder 100 of FIG. 1, but those skilled in the art will appreciate that method 200 may be performed for other devices. The steps of the flowcharts described herein are not all inclusive and may include other steps not shown. The steps described herein may also be performed in an alternative order.

In step 202, a preform that is made of unhardened fiber reinforced material is laid-up. The preform may comprise a thermoset or thermoplastic material, and may be reinforced with carbon fibers, fiberglass, etc. For example, in one embodiment the preform comprises multiple plies of CFRP, and each ply has fibers that are arranged in a different direction. For example, as shown for fabrication system 300 of FIG. 3, an upper portion of preform 330 including surface 332 may be laid-up onto surface 312 mandrel 310, and a lower portion of preform 330 including surface 334 may be laid-up onto surface 322 of mandrel 320. Mandrel 310 and mandrel 320 may then be brought together to enforce a desired shape onto an Outer Mold Line (OML) of preform 330 during hardening.

Figure 3:
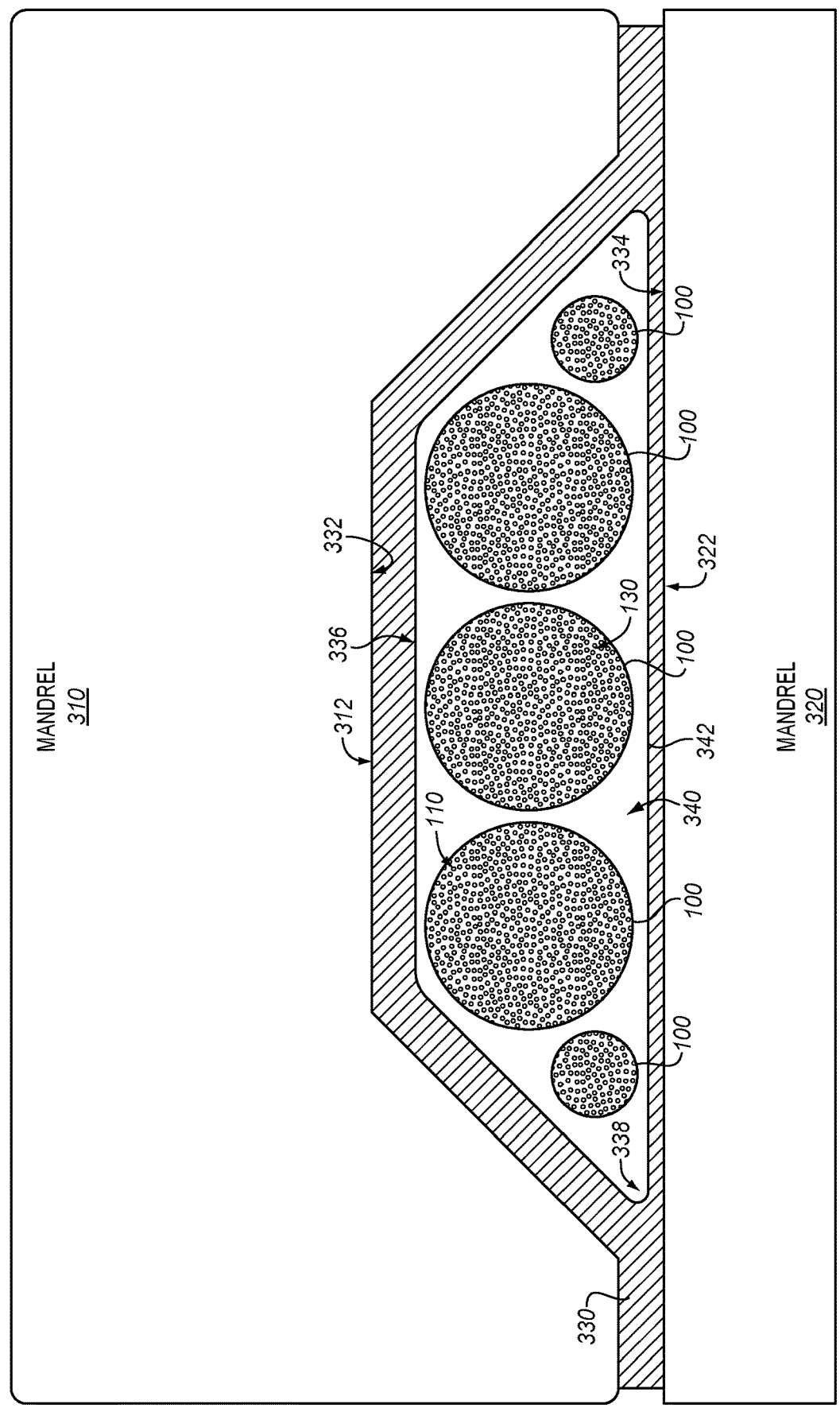
FIGS. 3-6 are side views of bladders inserted into a cavity of a preform in various illustrative embodiments.

The preform also includes a cavity. For example, as shown in FIG. 3, cavity 340 is defined by the boundaries of inner surface 336 (which forms an Inner Mold Line (IML) of preform 330). Cavity 340 is accessible via opening 342. Opening 342 provides access to cavity 340 via travel into or out of the page. Internal corners 338 within cavity 340 may be particularly hard to enforce a desired shape onto during hardening of preform 330.

In step 204, the bladders 100 are inserted into cavity 340. For example, as shown in FIG. 3, five of bladders 100 having varying sizes and/or shapes are inserted into cavity 340 via opening 342. The bladders 100 include pellets 130, which have not yet expanded. Thus, the aggregate volume of pellets 130 within a bladder 100 prior to expansion is less than or equal to the volume of internal space 140. Furthermore, the volume of the bladders 100 in total is less than the volume of cavity 340. This means that bladders 100 may be easily inserted into cavity 340 via opening 342. In further embodiments, the size, shape, and/or arrangement of the one or more bladders 100 within cavity 340 may vary based on the cross-sectional shape of cavity 340. This provides a technical benefit by enabling compaction of preforms having cavities of varying shapes and sizes.

In step 206, volumes of the pellets 130 are increased via a foaming agent within the pellets 130 due to a triggering condition. For example, the entirety of fabrication system 300 may be heated to a hardening temperature. In response to heating, or in response to another triggering condition, the foaming agent activates and increases in volume, which results in an increase in volume for the pellets 130. For example, the foaming agent may transition from a solid phase or a supercritical state into a gaseous state as the foaming agent is heated, resulting in an increase in pressure and volume at the pellets 130. Further examples of triggering conditions are temperature triggered chemical/physical reactions, depressurization of environmental pressure (such as that which occurs by taking pellets out of a pressure vessel, causing the pellets to foam at atmospheric pressure over time), ultraviolet triggered chemical reactions, and mixing of additional parts, such as two-part mixing an adhesive with the pellets.

In step 208, the bladders 100 are inflated in response to the triggering condition that causes the volumes of the pellets 130 to increase. For example, the triggering condition may cause the aggregate volume of pellets 130 within a bladder 100 to be greater than that of internal space 140. This causes the pellets 130 to apply forces to flexible casing 110 of the bladder 100, forcing the flexible casing 110 of the bladder 100 outward. This deformation of flexible casing 110 may be elastic or plastic, depending on the material of the bladder 100. While the bladders 100 are inflated, they contact an upper portion of inner surface 336 of preform 330, and apply forces that press this portion towards mandrel 310. The bladders 100 also contact a lower portion of inner surface 336 of preform 330, and apply forces that press this portion towards mandrel 320. This compacts the preform 330, which enforces a desired shape onto preform 330. In short, the preform 330 is laid-up against mandrel 310 and/or mandrel 320, and then brought into contact with the other mandrel. Inflating the bladders 100 presses the preform 330 against the mandrel 310 and the mandrel 320. Because pellets 130 freely move within the bladders 100 and because the bladders 100 have a flexible casing, the expansion of pellets 130 causes the bladders 100 to conform with and press against complex surface geometries, such as internal corners of the preform 330. Thus, in step 210, the preform 330 is consolidated while the bladders 100 are inflated. That is, pressure applied by the bladders 100 serves to consolidate the preform 330 against mandrel 310 and mandrel 320.

In step 212, the preform 330 is hardened into a composite part while the one or more bladders 100 are inflated. Thus, the one or more bladders 100 continue to enforce a desired shape upon preform 330 during the hardening process, and prevent the preform 330 from deforming or collapsing during hardening. The preform 330 may then complete hardening into a composite part. In some embodiments, the preform 330 may become rigid due to curing (for thermoset materials), while in other embodiments the preform 330 may harden due to cooling below a melting temperature (for thermoplastic materials).

In step 214, the one or more bladders 100 are deflated. This may be performed by decreasing the volumes of the pellets 130, such as by cooling the pellets 130 below a foaming temperature in order to decrease a volume of the foaming agents, or by any other suitable means. In a further embodiment, this may be performed by releasing some of the gas that was created to outside of the bladders 100 (e.g., by operating a port or piercing the bladders 100). The one or more bladders 100 are then removed from the cavity 340 in step 214 while in the deflated state, which provides a technical benefit of increased ease of removal.

Method 200 provides an advantage over prior techniques, because the use of pellets 130 increases the ability of bladders 100 to conform with corners found in cavity 340. By locating pellets 130 proximate to cavity features such as internal radii, bridging and other issues may be avoided during fabrication. Furthermore, because the pellets 130 are enclosed within bladders 100, the pellets 130 may be removed after preform 330 has been hardened, and the directions in which the pellets 130 expand may be controlled based on the dimensions of flexible casings 110 of the bladders 100 (as well as the materials that the flexible casings 110 are made from). Still further, bladders 100 do not need to be coupled with a separate inflation system, because bladders 100 already include the components used to facilitate their inflation. This eliminates a need to connect a hose to each bladder, which provides technical benefit of reduced labor during set up and removal of the bladders 100.

Figure 4:
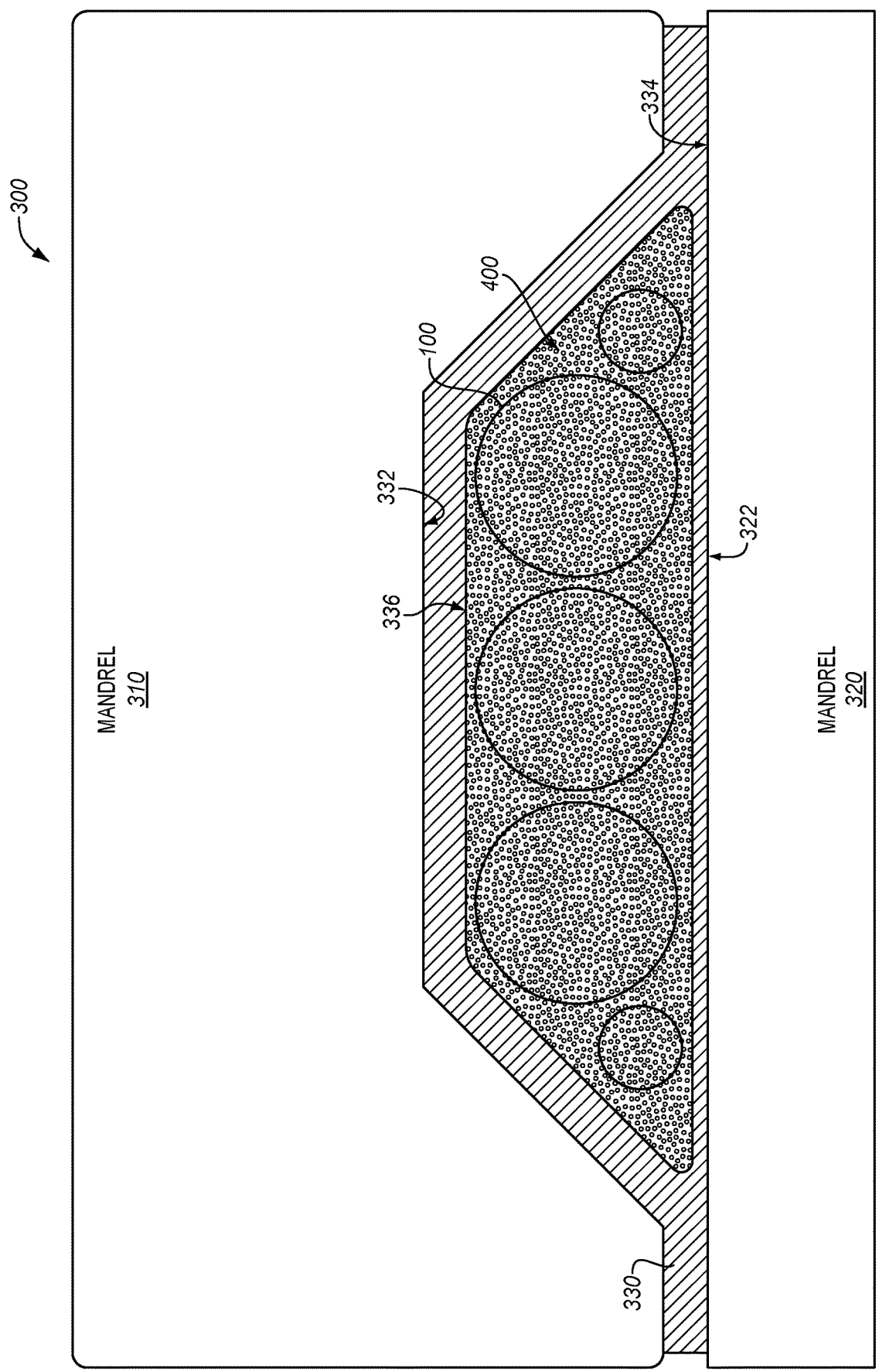
Figure 5:
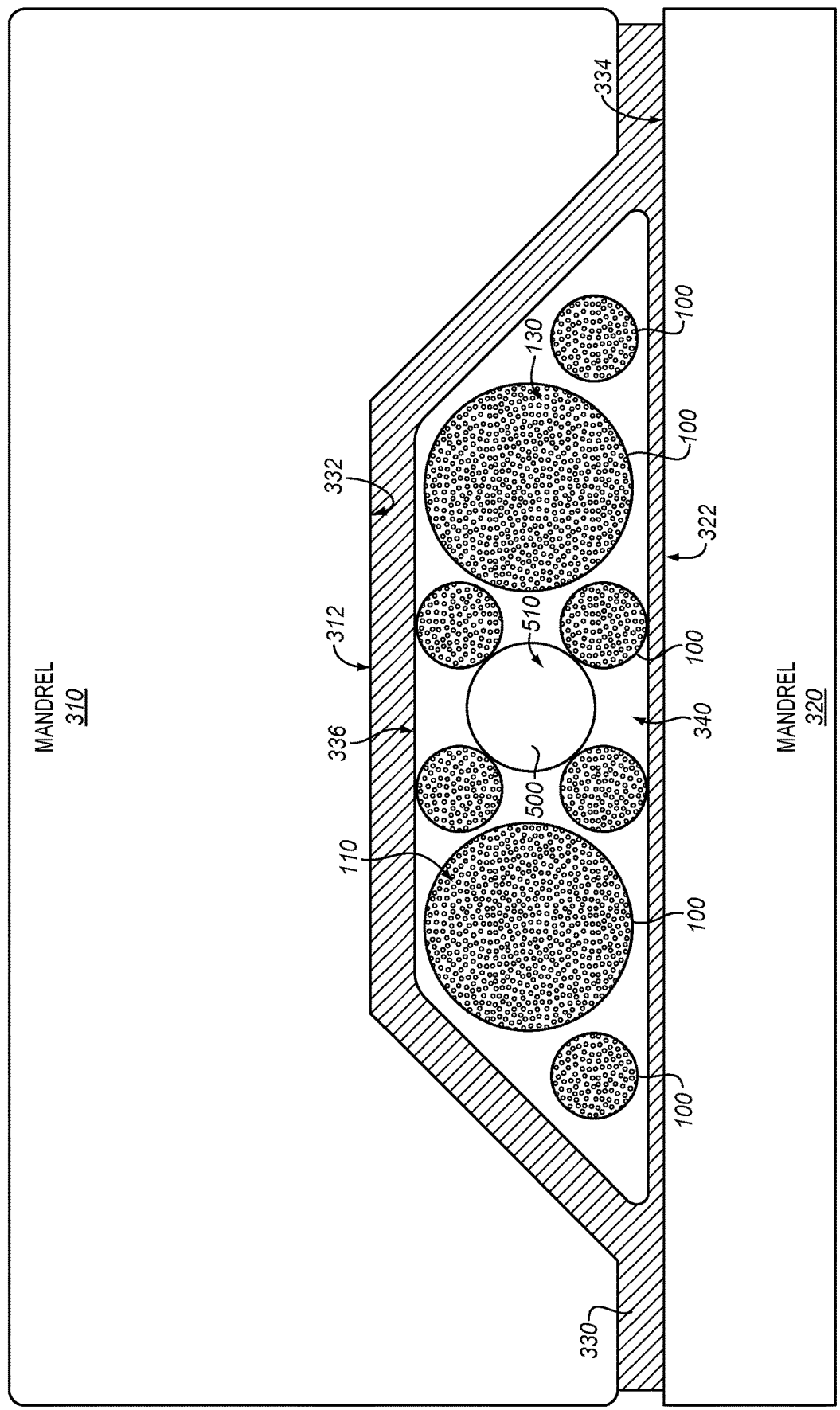
Figure 6:
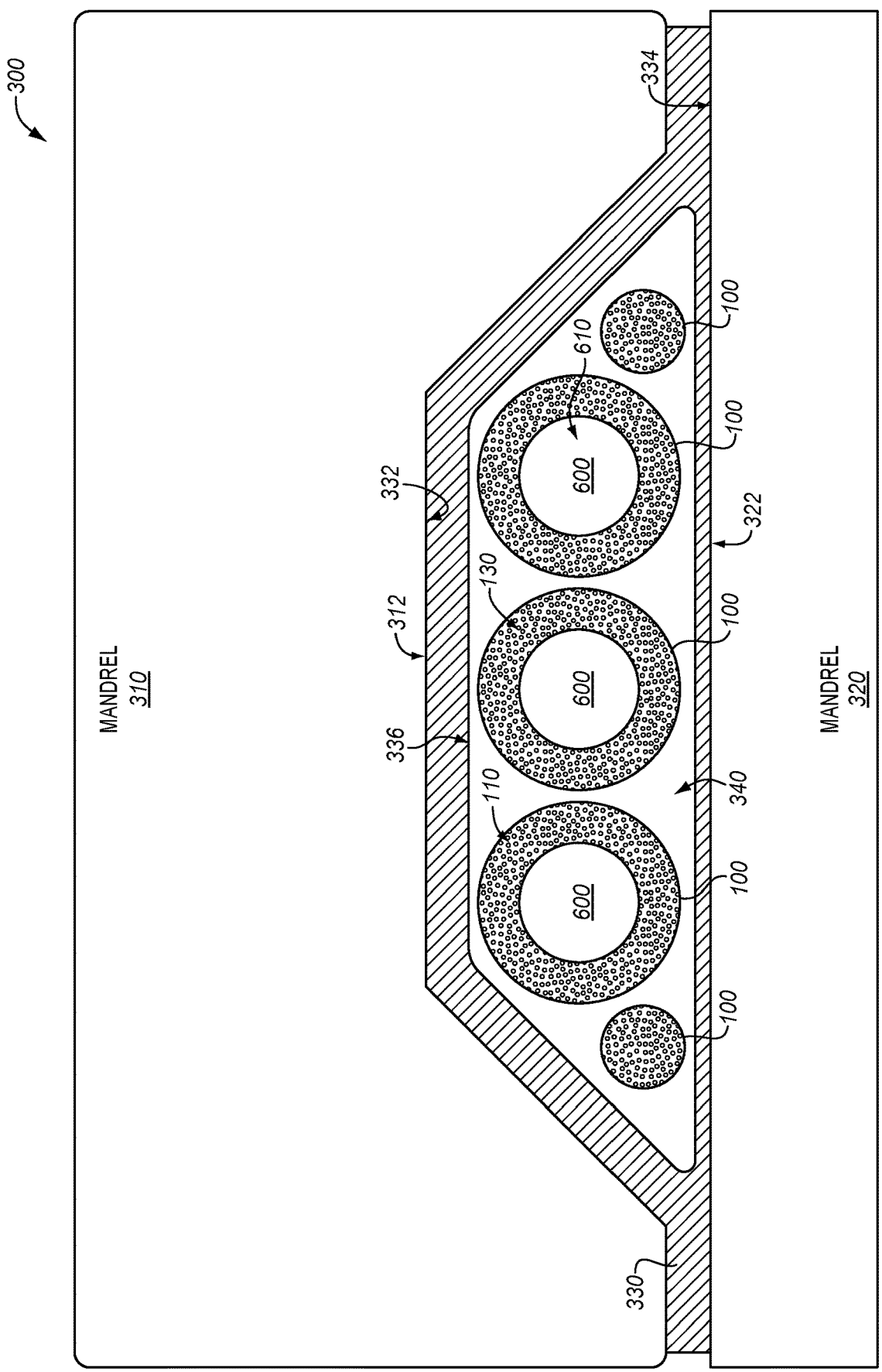

FIGS. 4-6 are side views of bladders inserted into a cavity of a preform in various illustrative embodiments. In FIG. 4, filler pellets 400 are included with the one or more bladders 100, so as to fill in gaps where bladders 100 do not reach when fully expanded. The filler pellets 400 that have been inserted into cavity 340 are external to the one or more bladders 100. Filler pellets 400 may comprise additional expandable pellets, or pellets that are non-expandable if desired.

In further embodiments, bars of material may be inserted into cavity 340 in addition to bladders 100. In on embodiment depicted in FIG. 5, a bar 500 (e.g., a hollow rod) made of a rigid material 510 has been inserted into cavity 340 together with bladders 100. The rigid material may comprise any suitable material that does not melt at the hardening temperature, such as aluminum, a thermoplastic material having a melting temperature that is higher than the hardening temperature of preform 330, etc. Bar 500 has a melting temperature higher than temperatures used during the hardening process. Thus, unlike the pellets 130, the bar 500 does not need to be recycled, but rather may be re-used. The use of bar 500 therefore reduces the need for as many bladders and pellets during the hardening process. Bar 500 may be placed in locations where it will not contact preform 330 after expansion, in order to ensure that forces are evenly applied to preform 330 during the hardening process. Bar 500 may also be solid or hollow as desired, and may have a Coefficient of Thermal Expansion (CTE) that provides a limited degree of expansion and contraction during the hardening process for preform 330.

In one embodiment depicted in FIG. 6, bars 600 of rigid material 610 are placed within bladders 100. Like bar 500 of FIG. 5, bars 600 reduce the amount of pellets 130 that are used during hardening of a preform 330, which in turn reduces an amount of material that needs to be recycled each time a preform 330 is hardened.

Figure 7:
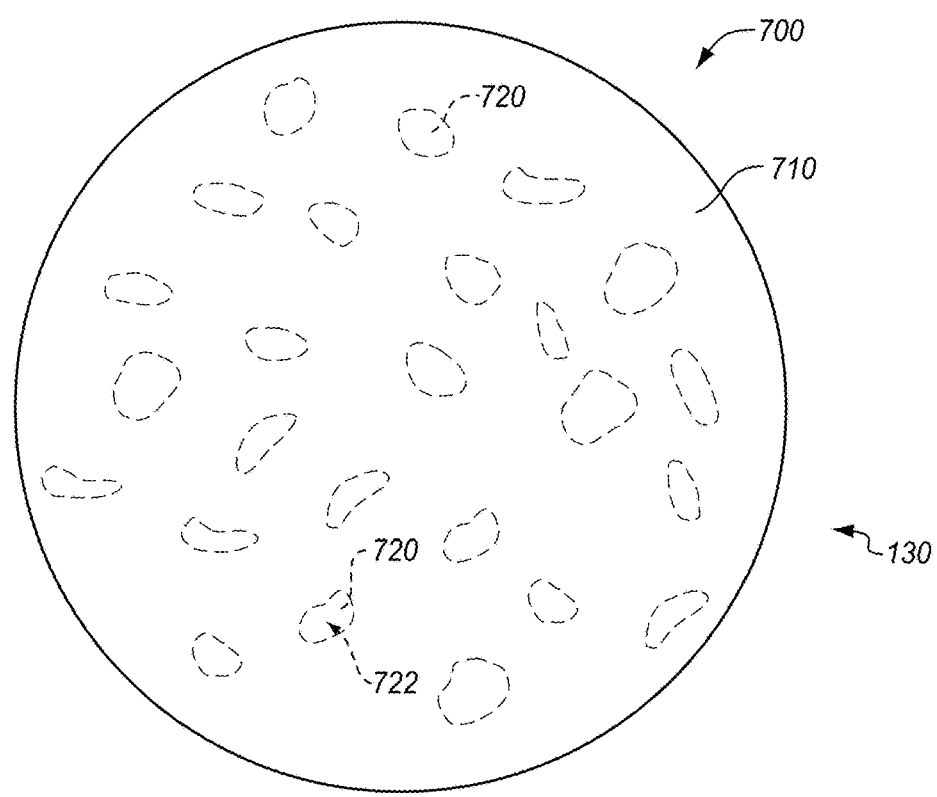
FIG. 7 illustrates a pellet that is expandable in an illustrative embodiment.

FIG. 7 illustrates a pellet 700 that is expandable in an illustrative embodiment. In this embodiment, pellets 700 includes a matrix 710 of expandable, flexible material such as a thermoplastic, polyurethane, polypropylene, nylon etc. Matrix 710 is made from a material which does not melt during the hardening process. Matrix 710 defines multiple airtight pockets 720 that are loaded with a foaming agent 722. Foaming agent 722 may comprise a gas, powder, supercritical gas, or other component. When foaming agent 722 is heated, it releases gas, which strains each of the airtight pockets 720. For example, the foaming agent 722 may enter a gaseous phase, or increase in volume in accordance with the ideal gas law during heating. The expansion of foaming agent 722 increases the size of each of airtight pockets 720, which in turn increases the entire volume of pellet 700. After foaming agent 722 is cooled, it may return to its original volume, or may keep an expanded shape without significant shrinkage. Matrix 710 may then remain in a plastically deformed and expanded state, collapse, or elastically return to its original size and shape. Pellet 700 may then be recycled by heating the pellets 700 to a melting temperature, and reusing the material that pellet 700 is made from. This means that new pellets may be fabricated using recycled materials harvested from pellets 700 that have already been used. In this embodiment, pellets 700 may comprise pellets, cylinders, spheres, shapes similar to rice grains, etc., ranging from one micrometer to one hundred millimeters in size when resting in an unexpanded state.

Figure 8:
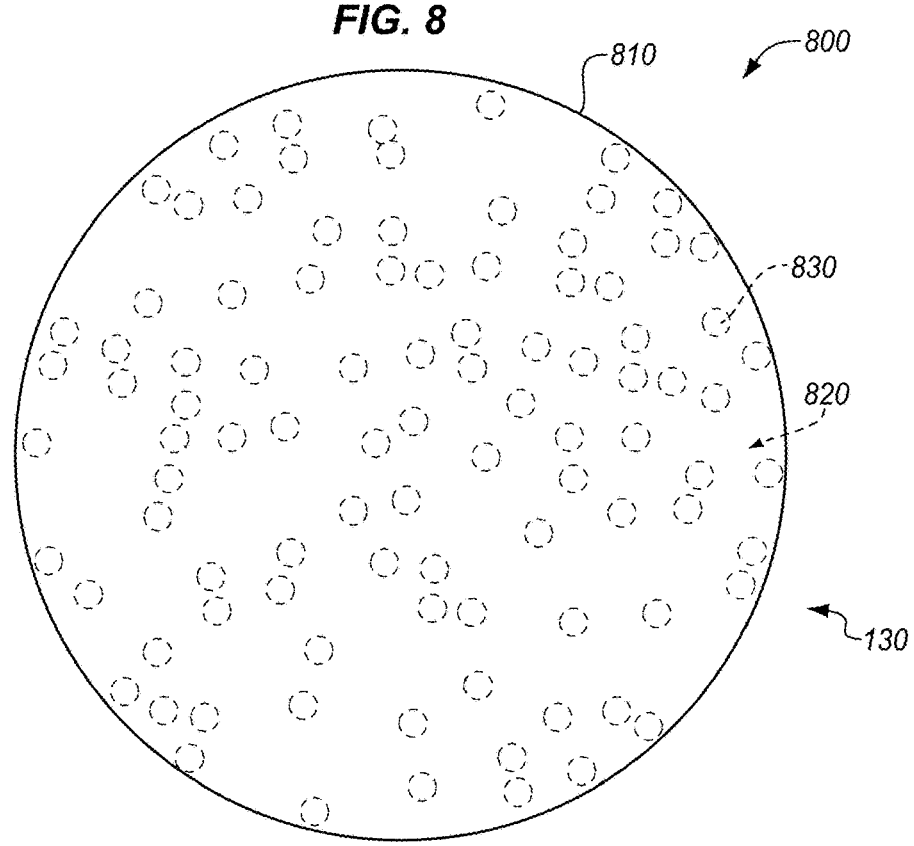
FIG. 8 illustrates a pellet that is expandable in a further illustrative embodiment.

FIG. 8 illustrates a pellet 800 that is expandable in a further illustrative embodiment. In this embodiment which varies from FIG. 7, pellet 800 comprises a "microballoon" having a flexible membrane 810 that encapsulates a group of nuclei 830 within an enclosed volume 820. Flexible membrane 810 is made from a material which does not melt during the hardening process. Nuclei 830 disposed within the enclosed volume 820 include a foaming agent. At a triggering condition (e.g., an activation temperature that is less than the hardening temperature of preform 330), foaming agent within the nuclei 830 releases gas. This gas pressurizes the nuclei 830, increasing their diameter (e.g., by ten to one hundred percent, or even more). The increased volume of the nuclei 830 then increases a volume of the pellet 800. In this embodiment, pellets 800 range one micrometer to ten millimeters in diameter when resting in an unexpanded state.

Figure 9:
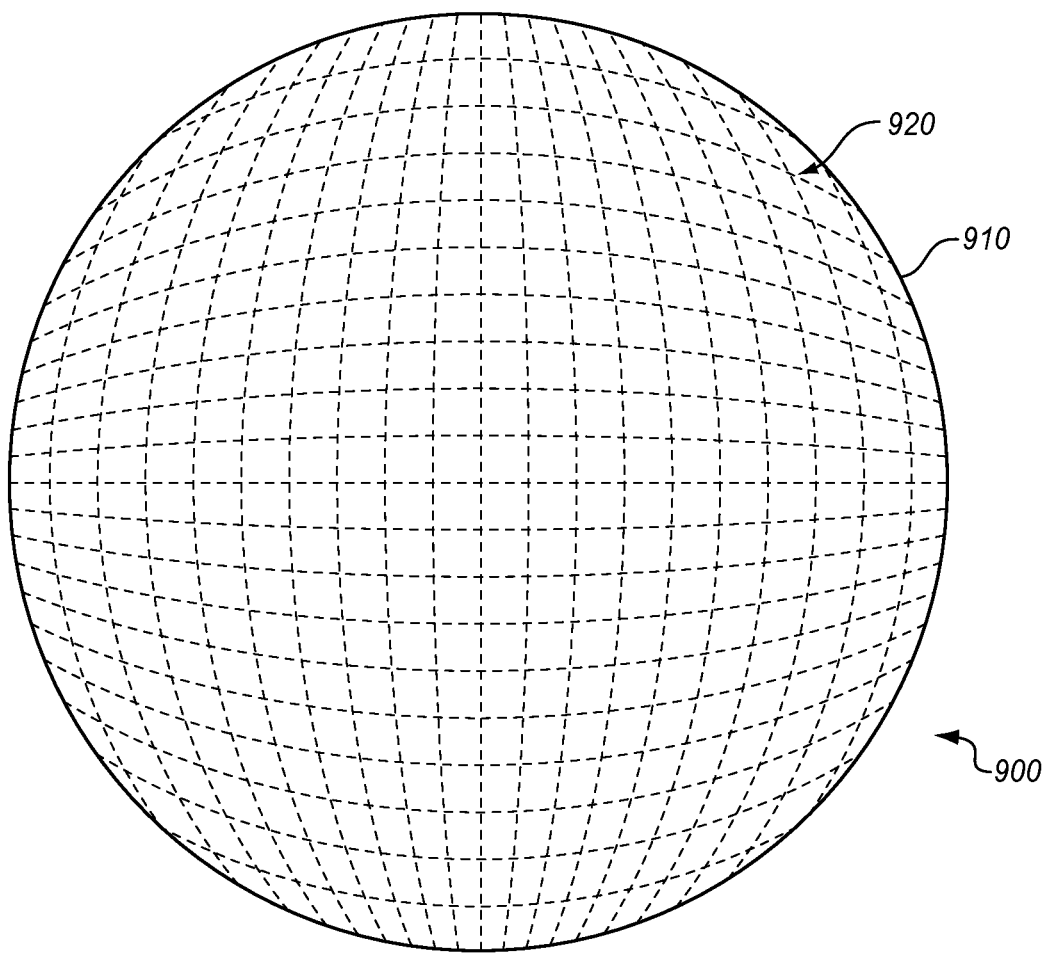
FIG. 9 illustrates a bladder that is fiber reinforced in an illustrative embodiment.

FIG. 9 illustrates a bladder 900 that is fiber reinforced in an illustrative embodiment. In this embodiment, flexible casing 910 of bladder 900 is reinforced with fibers 920 that enhance a resistance of bladder 900 to expansion beyond a predetermined size and shape. Fibers 920 therefore control an amount of expansion of bladder 900. Fibers 920 may assume any suitable orientations, or combinations thereof. When bladder 900 is inflated beyond the desired size and shape, fibers 920 are placed into tension, which substantially increases the ability of bladder 900 to resist further expansion. Bladder 900 may provide a technical benefit by preventing bladder 900 from rupturing or over-expanding when bladder 900 is overfilled with pellets. Bladder 900 may also include fibers for the purpose of influencing how bladder 900 expands. For example, arranging fibers in different patterns, orientations or directions may enable expansion of bladder 900 in different directions.

In further embodiments, the expansion of a bladder may be controlled by adjusting the number and/or type of pellets within the bladder, adjusting a thickness of flexible casing 110 or a material from which flexible casing 110 is made, adjusting a shape of the bladder, adjusting an amount of foaming agent within each pellet or a type of foaming agent within each pellet, adjusting a size of each pellet within the bladder, etc. The orientation and placement of fibers at a bladder may also play a role in shaping a bladder to conform with the shape of a cavity to be loaded.

In still further embodiments, a hollow shell (not shown) in the shape of a cavity 340 may be loaded with the bladders 100 described above, and the hollow shell may be inserted into cavity 340 of preform 330. The hollow shell may then be removed, leaving the bladders 100 in place to provide mechanical support during hardening of the preform 330.

EXAMPLES

In the following examples, additional processes, systems, and methods are described in the context of a hardening system for composite preforms.

Figure 10:
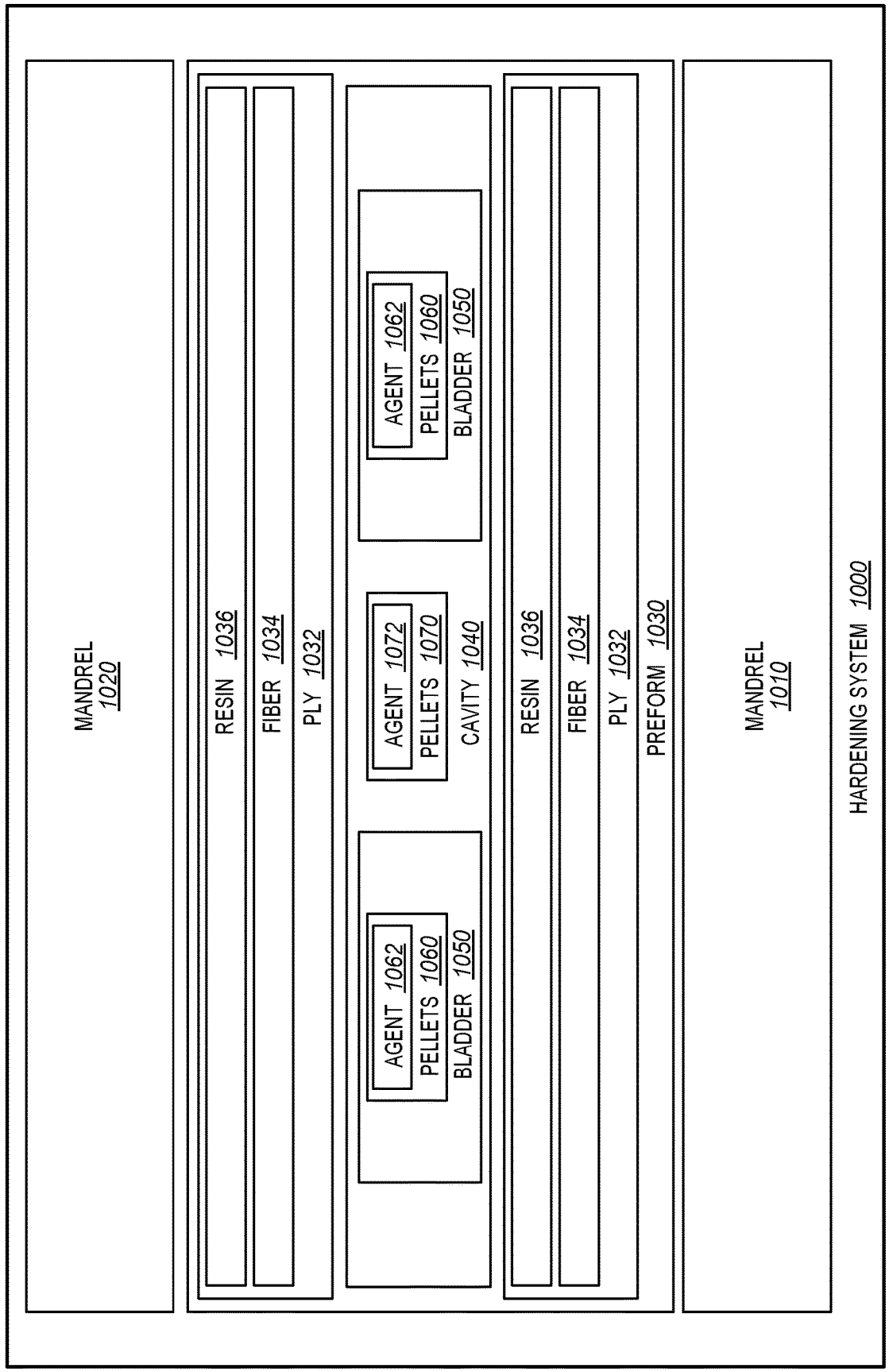
FIG. 10 is a block diagram of a hardening system in an illustrative embodiment.

FIG. 10 is a block diagram of a hardening system 1000 in an illustrative embodiment. According to FIG. 10, hardening system 1000 includes mandrel 1010 and mandrel 1020. Preform 1030 is laid-up against these mandrels, such that a ply 1032 contacts the mandrel 1010, and that a ply 1032 contacts the mandrel 1020. Each ply includes fibers 1034, as well as resin 1036. The plies 1032 together form a cavity 1040, which is loaded by bladders 1050. Bladders 1050 are loaded with pellets 1060, which are expandable, as well as pellets 1070, which are free within cavity 1040. Pellets 1060 include foaming agent 1062, which expands in response to increased temperature, and pellets 1070 include foaming agent 1072, which operates in a similar manner to foaming agent 1062.

Figure 11:
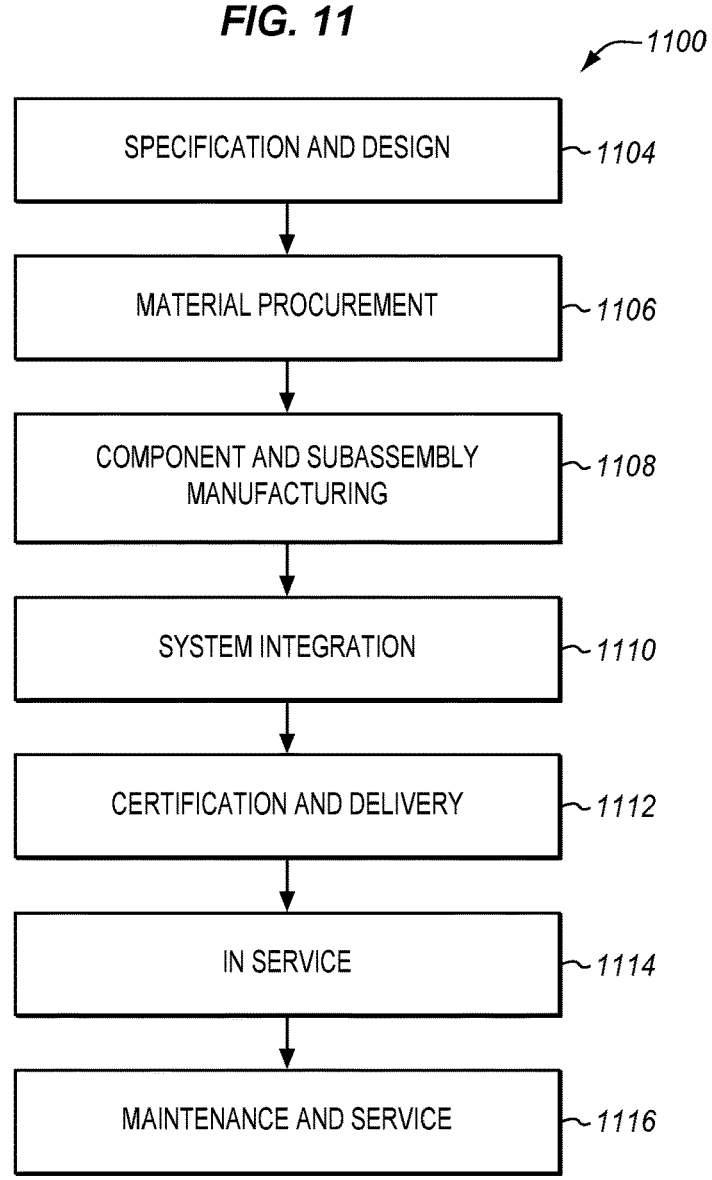
FIG. 11 is a flow diagram of aircraft production and service methodology in an illustrative embodiment.
Figure 12:
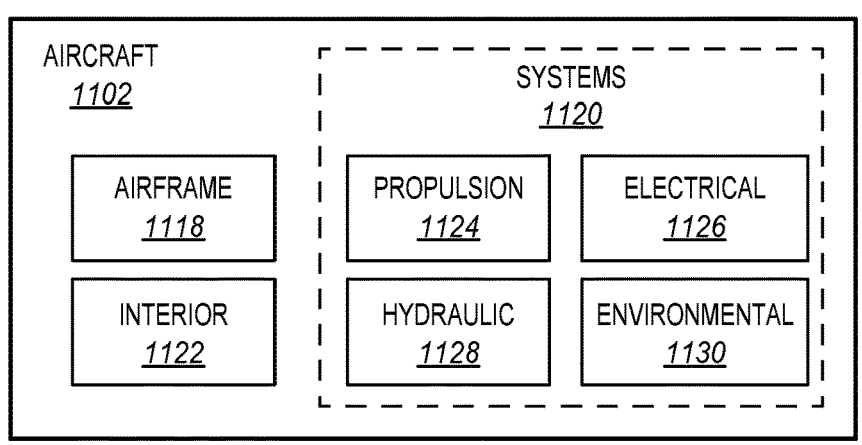
FIG. 12 is a block diagram of an aircraft in an illustrative embodiment.

Referring more particularly to the drawings, embodiments of the disclosure may be described in the context of aircraft manufacturing and service in method 1100 as shown in FIG. 11 and an aircraft 1102 as shown in FIG. 12. During pre-production, method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine work in maintenance and service 1116 (which may also include modification, reconfiguration, refurbishment, and so on). Apparatus and methods embodied herein may be employed during any one or more suitable stages of the production and service described in method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion system 1124, electrical system 1126, hydraulic system 1128, environmental 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by method 1100 may include an airframe 1118 with a plurality of systems 1120 and an interior 1122. Examples of systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1100. For example, components or subassemblies corresponding to component and subassembly manufacturing 1108 may be fabricated or manufactured in a manner similar to components or subassemblies produced while the aircraft 1102 is in service. Also, one or more apparatus embodiments, method embodiments, or a combination thereof may be utilized during the subassembly manufacturing 1108 and system integration 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation during the maintenance and service 1116. For example, the techniques and systems described herein may be used for material procurement 1106, component and subassembly manufacturing 1108, system integration 1110, service 1114, and/or maintenance and service 1116, and/or may be used for airframe 1118 and/or interior 1122. These techniques and systems may even be utilized for systems 1120, including, for example, propulsion system 1124, electrical system 1126, hydraulic 1128, and/or environmental system 1130.

In one embodiment, a part comprises a portion of airframe 1118, and is manufactured during component and subassembly manufacturing 1108. The part may then be assembled into an aircraft in system integration 1110, and then be utilized in service 1114 until wear renders the part unusable. Then, in maintenance and service 1116, the part may be discarded and replaced with a newly manufactured part. Inventive components and methods may be utilized throughout component and subassembly manufacturing 1108 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. More-over, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a composite part, the method comprising:
    laying up a preform that is made of fiber reinforced material and that includes a cavity;
    inserting one or more bladders that are loaded with expandable pellets into the cavity;
    inserting filler pellets into the cavity that are external to the one or more bladders;
    inflating the one or more bladders in response to a triggering condition that increases volumes of the expandable pellets and causes the pellets to force flexible casings of the one or more bladders outward;
    consolidating the preform while the one or more bladders are inflated;
    deflating the one or more bladders by cooling the one or more bladders; and
    removing the one or more bladders from the cavity.

2. The method of claim 1 further comprising:
    hardening the preform into a composite part while the one or more bladders are inflated.

3. The method of claim 1 further comprising:
    increasing volumes of the expandable pellets is performed via a foaming agent within the pellets, wherein:
    inflation of the one or more bladders is caused by the volumes of the pellets increasing, and wherein:
    deflating the one or more bladders comprises cooling the expandable pellets below a foaming temperature of the foaming agent.

4. The method of claim 1 wherein:
    the filler pellets comprise additional expandable pellets.

5. The method of claim 1 further comprising:
    inserting an additional bladder that is loaded with additional expandable pellets into the cavity.

6. The method of claim 1 further comprising:
    arranging the one or more bladders within the cavity based on a cross-sectional shape of the cavity.

7. The method of claim 1 further comprising:
    selecting shapes of the one or more bladders based on a cross-sectional shape of the cavity.

8. The method of claim 1 further comprising:
    laying the preform up against a mandrel prior to inflating the one or more bladders.

9. The method of claim 1 wherein:
    increasing the volumes of the pellets via releasing gas by triggering a foaming agent.

10. The method of claim 1 wherein:
    the triggering condition is selected from the group consisting of: temperature triggered reactions, depressurization, ultraviolet triggered chemical reactions, and mixing of additional parts.

11. The method of claim 1 further comprising:
    hardening the preform to form a portion of an aircraft.

12. The method of claim 1 wherein:
    laying up the preform that is made of fiber reinforced material comprises laying up a preform that is made of Carbon Fiber Reinforced Polymer (CFRP).

13. The method of claim 1 wherein:
    inserting the one or more bladders that are loaded with expandable pellets comprises inserting one or more bladders that are loaded with pellets that each comprise a matrix of flexible material having airtight pockets.

14. The method of claim 1 wherein:
    inflating the one or more bladders comprises activating a foaming agent.

15. The method of claim 14 wherein:
    activating the foaming agent causes the expandable pellets increase in size.

16. The method of claim 1 wherein:
    inflating the one or more bladders applies forces to an elastically deformable material of the flexible casings of the one or more bladders.

17. The method of claim 1 wherein:
    deflating the one or more bladders comprises piercing the one or more bladders.

18. The method of claim 1 wherein:
    deflating the one or more bladders comprises operating a port at the one or more bladders.

19. The method of claim 1 further comprising:
    including one or more bars of rigid material within the one or more bladders.

20. The method of claim 19 wherein:
    including the one or more bars of rigid material comprises inserting one or more bars that are hollow.

21. A non-transitory computer readable medium embodying programmed instructions which, when executed by a processor, are operable for performing a method for fabricating a composite part, the method comprising:
    laying up a preform that is made of fiber reinforced material and that includes a cavity;
    inserting one or more bladders that are loaded with expandable pellets into the cavity;
    inserting filler pellets into the cavity that are external to the one or more bladders;
    inflating the one or more bladders in response to a triggering condition that increases volumes of the expandable pellets and causes the pellets to force flexible casings of the one or more bladders outward;
    consolidating the preform while the one or more bladders are inflated;
    deflating the one or more bladders by cooling the one or more bladders; and
    removing the one or more bladders from the cavity.

22. The non-transitory computer readable medium of claim 21 wherein:
    the method further comprises hardening the preform to form a portion of an aircraft.

* * * * *